United States Patent [19]
Edwards, Jr. et al.

[11] Patent Number: 5,615,792
[45] Date of Patent: Apr. 1, 1997

[54] ENCLOSURE FOR A SOLID STATE OVERLOAD RELAY MECHANISM OR OTHER DEVICE

[75] Inventors: Stanley H. Edwards, Jr.; Richard Marshall, both of Raleigh, N.C.

[73] Assignee: Square D Company, Palatine, Ill.

[21] Appl. No.: 322,844

[22] Filed: Oct. 13, 1994

[51] Int. Cl.$^6$ ................. H02G 3/08; H02G 3/16
[52] U.S. Cl. ................ 220/3.8; 220/3.2; 220/3.9
[58] Field of Search .................... 220/3.2, 3.3, 3.6, 220/3.8, 3.4, 3.5, 3.9; D13/152

[56] References Cited

U.S. PATENT DOCUMENTS

| | | | |
|---|---|---|---|
| 3,376,542 | 4/1968 | Vlaminck | D13/152 X |
| 4,012,580 | 3/1977 | Arnold | 220/3.2 X |
| 4,023,697 | 5/1977 | Marrero | 220/3.3 X |
| 4,062,470 | 12/1977 | Boteler | 220/3.3 |
| 4,214,668 | 7/1980 | Neff et al. | 220/3.3 |
| 4,612,603 | 9/1986 | Cook | 220/3.9 X |
| 4,706,808 | 11/1987 | Guetersloh | 220/3.3 X |
| 5,078,171 | 1/1992 | Moore et al. | 220/3.4 X |

FOREIGN PATENT DOCUMENTS

| | | | |
|---|---|---|---|
| 1077870 | 8/1967 | United Kingdom | 220/3.6 |

*Primary Examiner*—Sue A. Weaver
*Attorney, Agent, or Firm*—Larry I. Golden; David Russell Stacey; Larry Shrout

[57] ABSTRACT

An enclosure is for a solid state overload relay mechanism or other device. The enclosure includes a mounting plate (12) defining a pair of upwardly extending flanges (14). A housing includes a lower housing (18) and an upper housing. The mounting plate flanges (14) are received through slotted openings (22) defined by the lower housing (18) and define openings (26) for engaging a tab member (28) defined by the lower housing (18). Each tab member (28) is received within and engaged with a corresponding opening (26) defined by a flange (14). A constant pressure is maintained between the tab member (28) and the mounting plate flange opening (26) such that the relative position between the two is fixed. Mounting profiles are defined by the mounting plate (12) and extend away from the lower housing (18) for retrofitting an existing device. The upper and lower housings (18,20) are held in a conventional snap-fit manner.

15 Claims, 6 Drawing Sheets

ENCLOSURE FOR A SOLID STATE OVERLOAD RELAY MECHANISM OR OTHER DEVICE

TECHNICAL FIELD

This invention relates to the field of current overload protection devices. More specifically, this invention relates to an enclosure for a solid state overload relay mechanism or other device.

BACKGROUND ART

In the field of overload relay devices, and in the field of electrical circuitry in general, it is well known that housings are typically fabricated from a non-conducting material such as plastic for many reasons. Safety and efficiency are the predominant factors dictating the use of such materials. However, it is typically preferred that a more durable, rigid material be used for mounting the housing to a structure such as a wall, a piece of electrical equipment, or the like.

Heretofore, mounting plates have been secured to housings using screw-type or other metal fasteners. Alternatively, a mounting plate may be mounted to a housing in a snap fit fashion. Each of these constructions have a potential for undesirable results. Screw-type fasteners are obviously more complicated to employ than snap-fit configurations, and are known to have the potential of loosening under vibration. Conventional snap-fit configurations do not provide a positive force between the mounting plate and the housing such that a secure connection is provided.

DISCLOSURE OF THE INVENTION

Therefore, it is an object of the present invention to provide a means for securing a mounting plate to a housing without requiring the use of conventional fasteners.

Another object Of the present invention is to provide an integral means wherein a positive force securely attaches the mounting plate to the housing such that relative movement one to the other is prohibited regardless of manufacturing tolerances between the two parts.

Other objects and advantages will be accomplished by the present invention which serves to secure a mounting plate to a housing. The enclosure of the present invention includes a mounting plate fabricated from a rigid metal. A pair of upwardly extending flanges is provided for engaging the housing. The housing includes a lower housing and an upper housing. The mounting plate flanges are received through slotted openings defined by the lower housing and define openings for being selectively engaged by a tab member defined by the lower housing.

Each tab defined by the lower housing defines an L-shaped configuration, with a vertical portion extending upward toward the open end of the lower housing and a horizontal portion adjacent a proximal end. The mounting flange is received within the lower housing such that the tab members are proximate corresponding flange openings. When a sufficient downward force is applied to the horizontal portion, the tab member is received within and engaged with the flange opening. A constant pressure is maintained between the tab member and the mounting plate flange opening such that the relative position between the two is fixed.

Mounting profiles are defined by the mounting plate and extend away from the lower housing. The mounting profiles are provided for retrofitting an existing melting alloy overload relay with a mechanism incorporating the enclosure of the present invention.

In order to secure the lower housing to the upper housing without requiring conventional fasteners, a conventional snap-fit method is employed.

BRIEF DESCRIPTION OF THE DRAWINGS

The above-mentioned features of the invention will become more clearly understood from the following detailed description of the invention read together with the drawings in which.

BEST MODE FOR CARRYING OUT THE INVENTION

Figure 1:
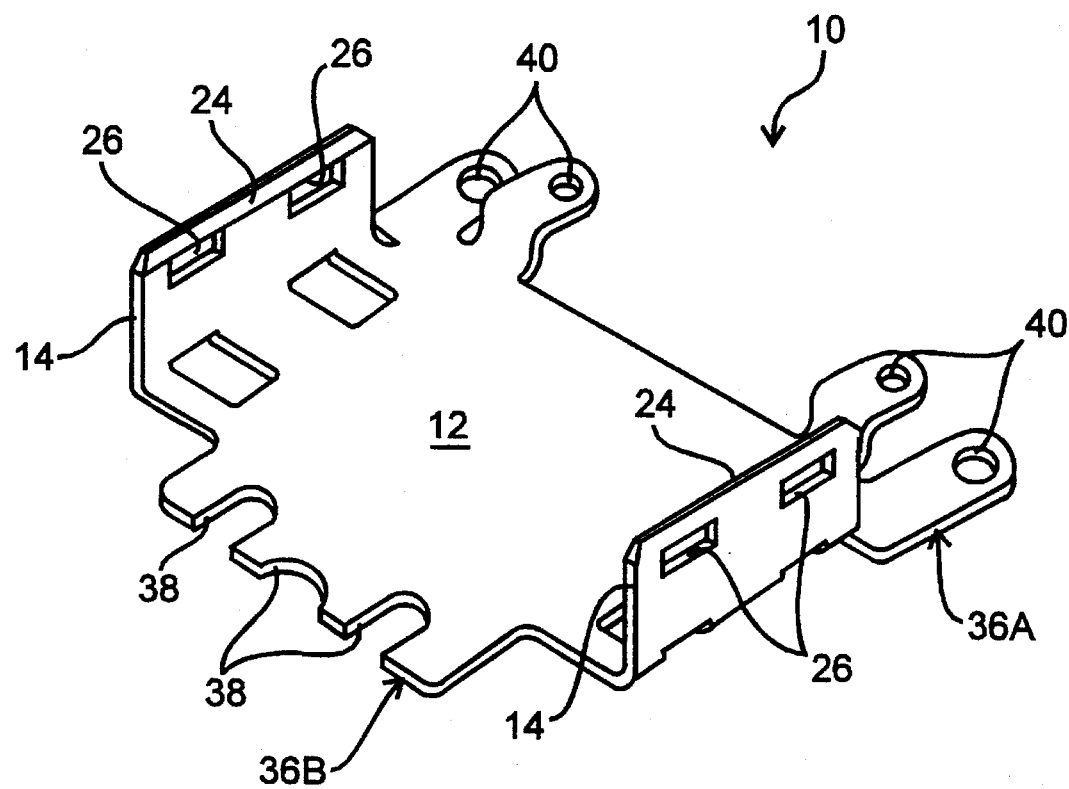
FIG. 1 is an isometric view of a mounting plate constructed in accordance with several features of the present invention.

An enclosure for a solid state overload relay mechanism or other device incorporating various features of the present invention is illustrated generally at 10 in the figures. The enclosure for a solid state overload relay, or enclosure 10 is designed for housing an electrical device such as a solid state overload relay mechanism 100. Moreover, in the preferred embodiment the enclosure 10 is designed to provide a means for positively securing a mounting plate 12 thereto without the use of conventional screw-type or other fasteners.

The mounting plate 12 is fabricated from a rigid material. In the preferred embodiment, the mounting plate 12 is fabricated from a rigid metal. A pair of upwardly extending flanges 14 is provided for engaging a housing 16. In the illustrated embodiment, the housing 16 includes a lower housing 18 and an upper housing 20. The mounting plate flanges 14 are received through slotted openings 22 defined by the lower housing 18. In order to facilitate receipt of the flanges 14 within the slotted openings 22, the flanges 14 are provided with tapered distal ends 24.

Figure 5:
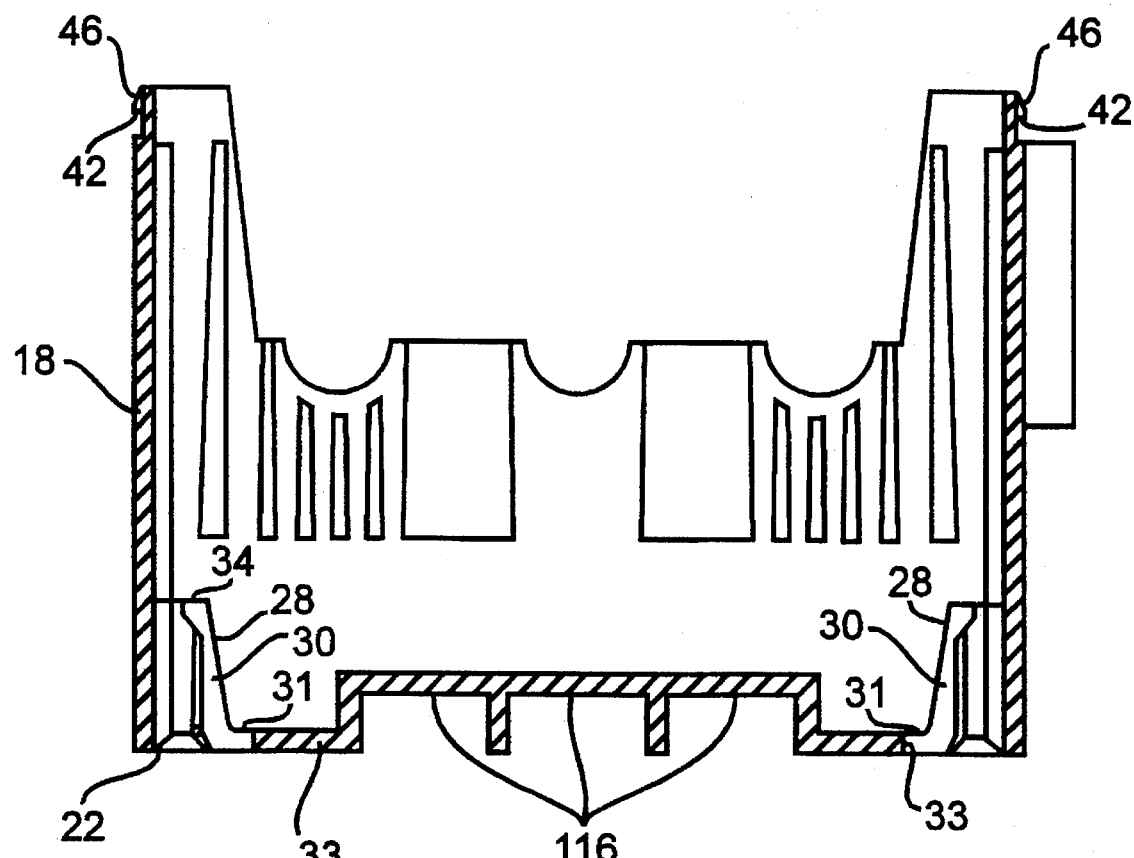
FIG. 5 illustrates a cross-sectional front elevation view of a lower housing constructed in accordance with several features of the present invention.
Figure 6:
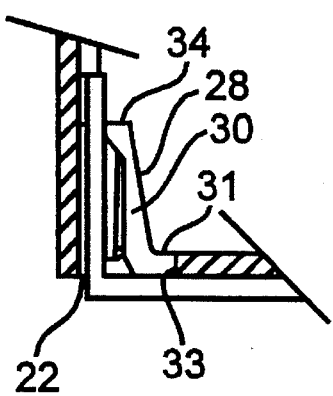
FIG. 6 is an enlarged portion of the lower housing illustrated in FIG. 5 showing a mounting plate flange received through an opening defined by the lower housing.
Figure 7:
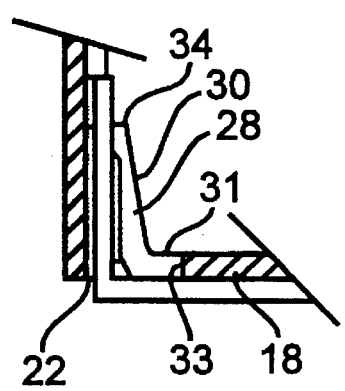
FIG. 7 is an enlarged portion of the lower housing illustrated in FIG. 5 showing a mounting plate flange received through an opening defined by the lower housing, wherein a tab defined by the lower housing is engaged with the mounting plate flange.

Openings 26 are defined by the flanges 14 proximate their distal ends 24, each opening 26 has an upper edge 32 for being selectively engaged by a tab member 28 defined by the lower housing 18. Each tab 28 defined by the lower housing 18 defines an L-shaped configuration, with a vertical portion 30 extending upward toward an open end of the lower half 18 and a horizontal portion 31 adjacent a proximal end 33. FIG. 5 illustrates a cross section of the lower housing 18 showing a tab member 28 proximate each end of the lower housing 18. FIG. 6 illustrates a portion of the lower housing 18 wherein the mounting plate flange 14 has been received within the slotted opening 22 defined by the lower housing 18. In this stage, the lower housing tab member 28 and the flange opening 26 are not engaged. In order to engage the two, an external downward force is applied to the horizontal portion 31 or a distal end 34 of the tab member 28 causing the tab member 28 to pivot downward about the proximate end 33 into a relief 35 located in the mounting plate 12/12a thereby permitting the distal end 34 of the tab member 28 to be received within the opening 26 as illustrated in FIG. 7. Due to the properties of the material of fabrication of the housing 16, the tab member 28 has a tendency to return to its original position after the downward force is released. Therefore, the distal end 34 forcibly engages the upper edge 32 of the flange opening 26 thereby insuring that a constant pressure is maintained between the tab member 28 and the mounting plate 12. Thus, when the four illustrated tab members 28 are engaged with the respective four flange openings 26, a positive force is maintained between the mounting plate 12 and the lower housing 18 such that the relative position between the two is fixed.

Figure 8:
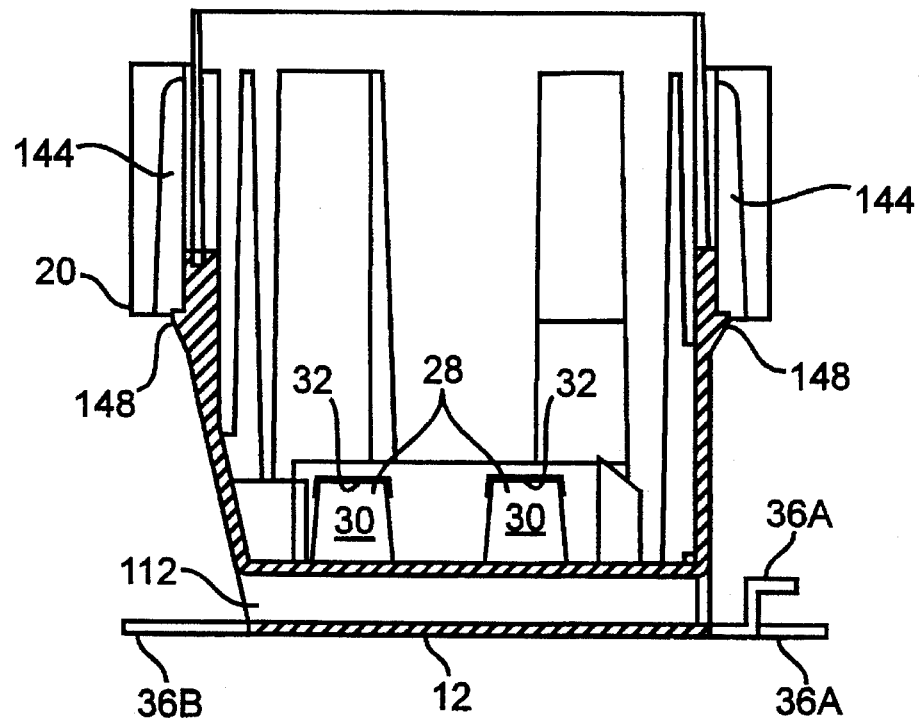
FIG. 8 is a cross-sectional end elevation view of the lower housing illustrated in FIG. 7.

As illustrated in FIG. 8, the distal end 34 of the tab member 28 and the upper edge 32 of the flange opening 26 define similar configurations to help maintain the engagement. In FIG. 8, a linear configuration for each is defined. However, it will be understood that other configurations may be defined as well.

Figure 2:
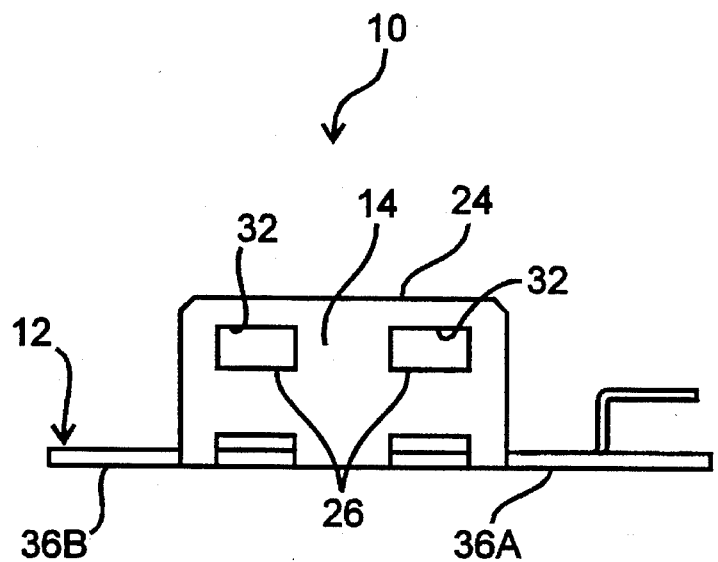
FIG. 2 illustrates an end elevation view of the mounting plate illustrated in FIG. 1.
Figure 3:
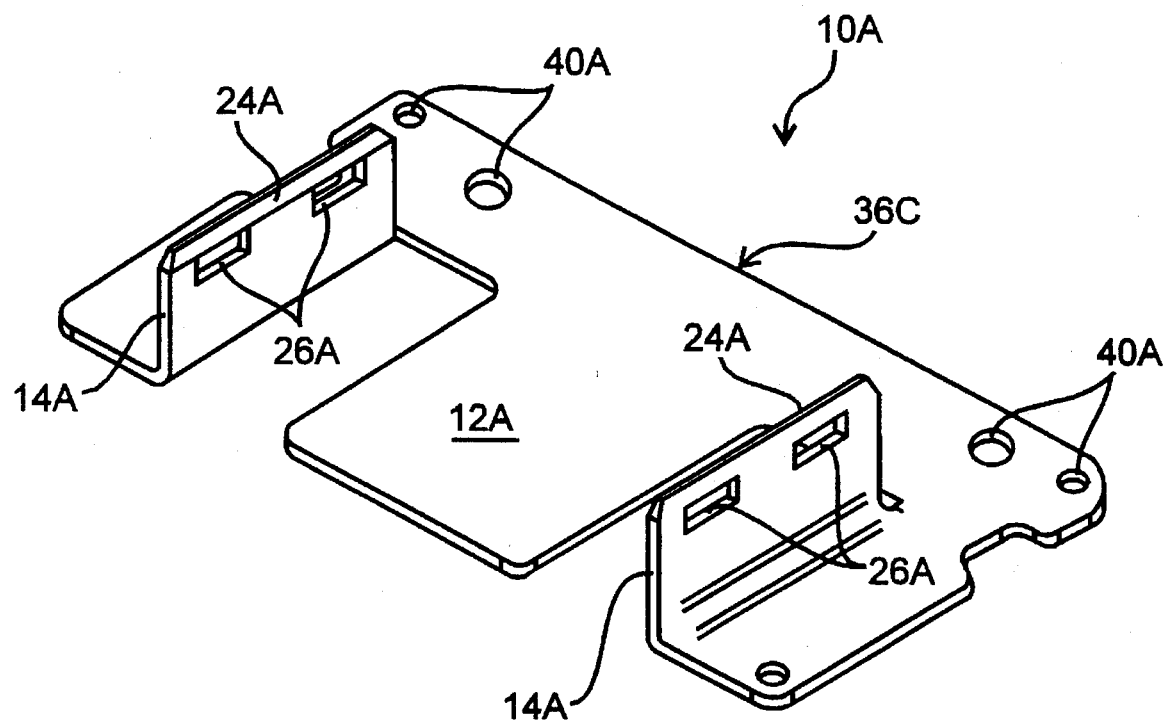
FIG. 3 is an isometric view of an alternate embodiment of a mounting plate constructed in accordance with several features of the present invention.
Figure 4:
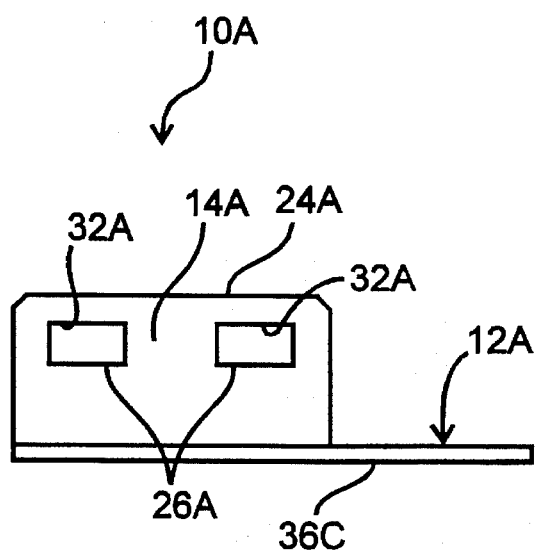
FIG. 4 illustrates an end elevation view of the mounting plate illustrated in FIG. 3.

Mounting profiles 36A and 36B are defined by the mounting plate 12 and extend away from the lower housing 18. The mounting profiles 36A and 36B are provided for retrofitting an existing melting alloy overload relay with a mechanism incorporating the enclosure 10 of the present invention. Thus, the mounting profiles 36A and 36B are substantially similar to the mounting profiles of conventional devices. The illustrated embodiment of FIGS. 1 and 2 includes two mounting profiles, one, 36B, defining three slotted openings 38 and the other, 36A, defining four extended portions, each defining an opening 40 for receiving a screw-type fastener. The embodiment illustrated in FIGS. 3 and 4 includes one mounting profile 36C defining a planar member defining four openings 40A for receiving screw-type fasteners. Other reference numerals ending in a suffix "A" are the same as those described in FIGS. 1 and 2.

Figure 9:
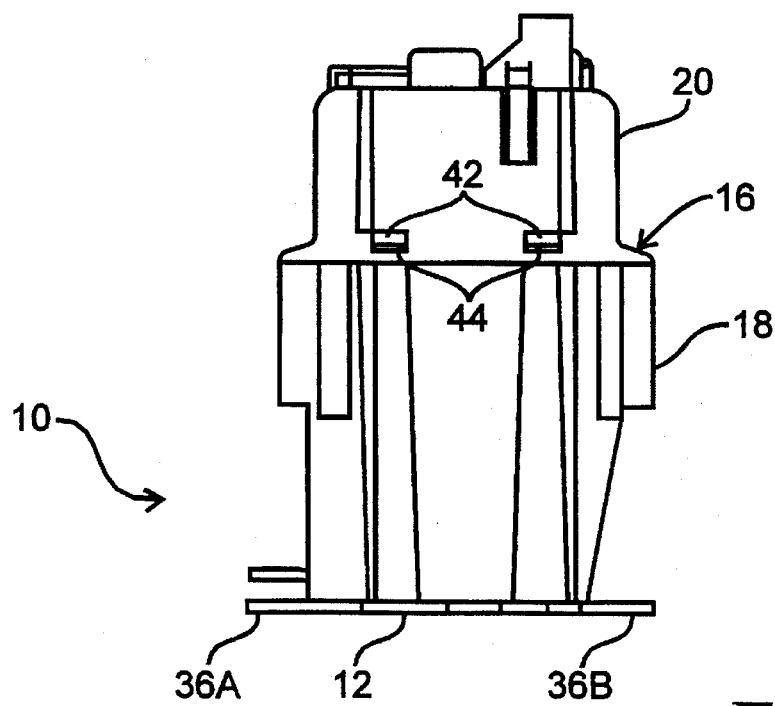
FIG. 9 is an end elevation view of the enclosure of the present invention showing a mounting plate secured to a lower housing and a lower housing and upper housing being engaged one with the other.

In order to secure the lower housing 18 to the upper housing 20 without requiring conventional fasteners, a plurality of tab members 42 is defined by the lower housing 18 proximate the top thereof. The upper housing 20 defines a corresponding plurality of openings 44. In order to assemble the upper housing 20 to the lower housing 18, the upper housing 20 is placed over the lower housing 18 and pressed down. A downward force serves to push the lower perimeter of the upper housing 20 over the lower housing tabs 42 until each is received within its corresponding opening 44, as is illustrated in FIG. 9. Each tab is provided with a tapered top edge 46 in order to facilitate the receipt of the upper housing 20 over the lower housing 18. Thus, the securement of the upper and lower housing, 20 and 18 respectively, is accomplished in a conventional snap-fit fashion.

Figure 10:
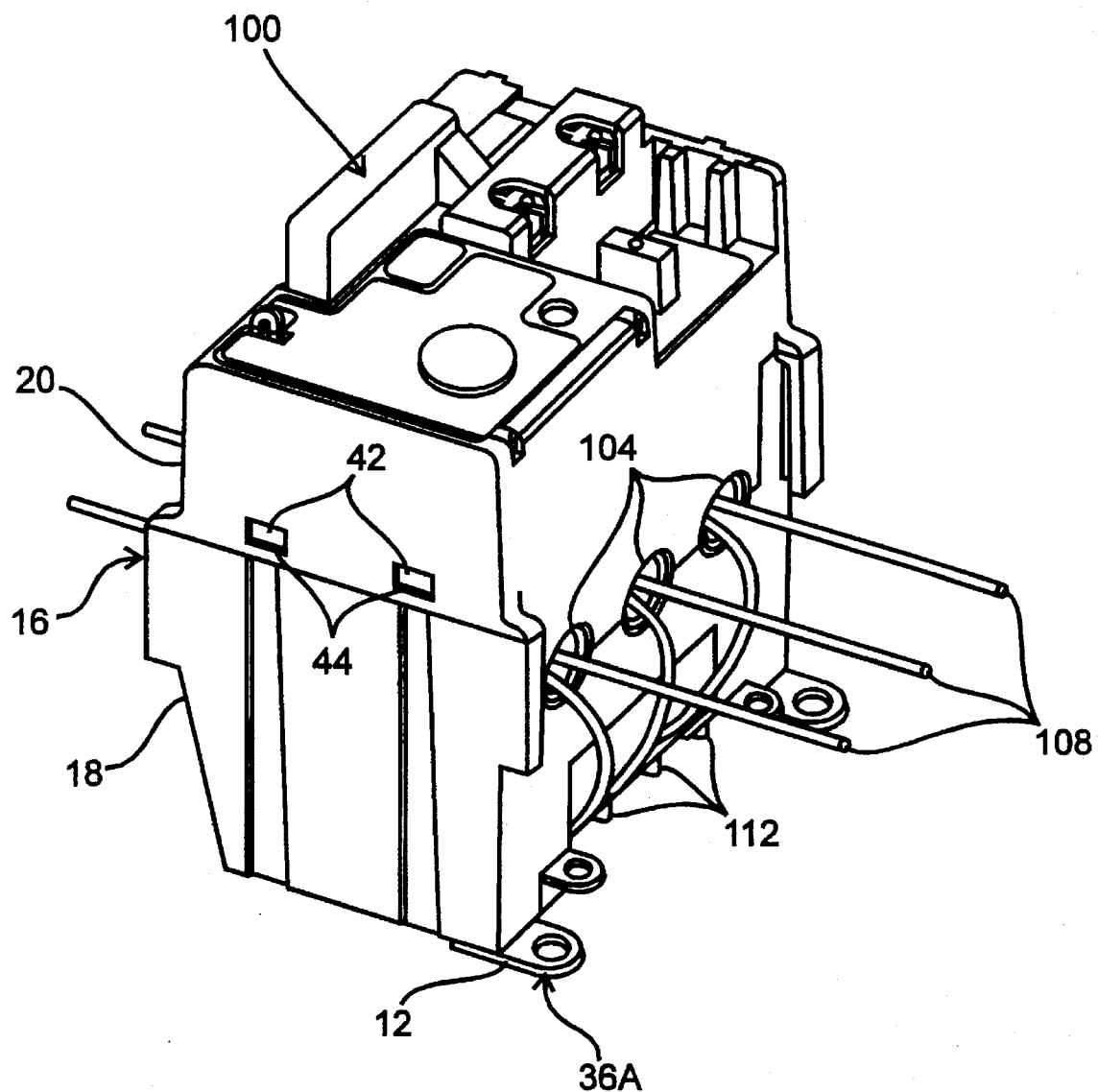
FIG. 10 is an isometric view of the enclosure of the present invention shown configured to enclose a solid state overload relay mechanism.

FIG. 10 is an illustration of the enclosure of the present invention used to house a solid state overload relay mechanism 100. However, it will be understood that the configuration provided in the present invention for securing a mounting plate 12 to a housing 16 may be incorporated in many other devices as well.

Referring again to FIG. 10, the enclosure 10 defines one or more of passages 104, including at least one for each phase of the protected circuit. Each passage 104 receives a conductor 108 of the protected circuit and directs the conductor 108 through a current transformer which is a part of the overload relay mechanism 100 and is enclosed within the housing 10. Generally the conductor 108 is required to pass through the current transformer only one time, thereby providing one primary turn for the current transformer. However, it is sometimes required to increase the current transformer output and therefore additional turns of the primary are required. To increase the primary turns the conductor 108 must pass through the passage 104 the number of times required to produce the desired current transformer output. In order to prevent the looped conductors 108 from interfering with the operation of the overload relay or hanging loosely around the relay housing 10 a conductor restraining passage 112 is provided. The conductor restraining passage 112 is formed by the mounting plate 12 and a number of grooves 116, as shown in FIG. 5, defined by the lower housing 18. One conductor restraining passage 112 is provided for each current transformer.

Figure 12:
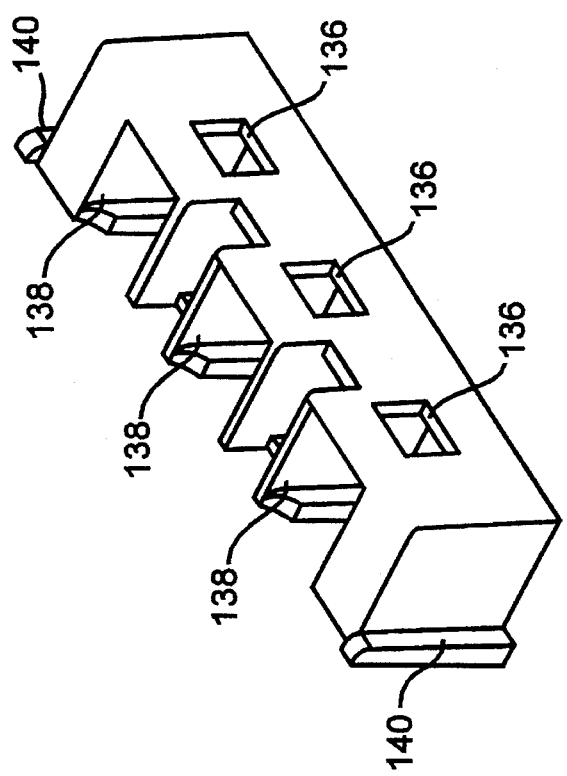
FIG. 12 is an isometric view of a lug shroud of the present invention.
Figure 11:
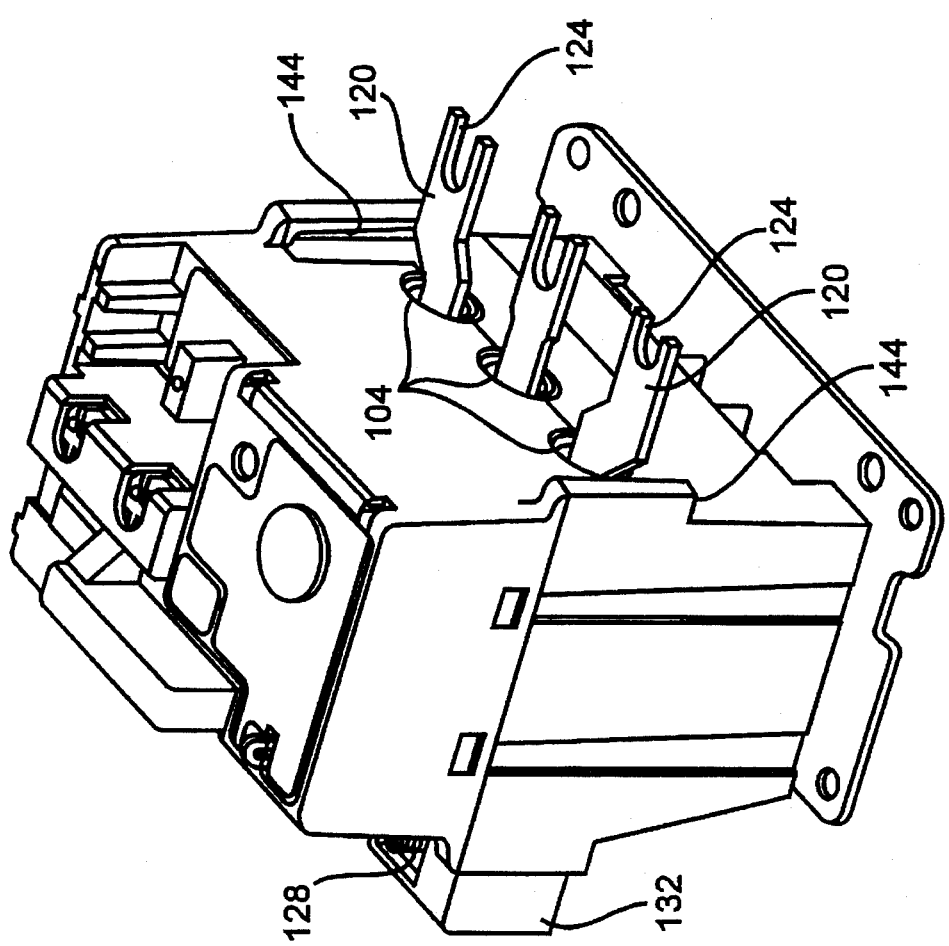
FIG. 11 is an isometric view of the enclosure of the present invention shown configured to enclose a solid state overload relay mechanism wherein a optional lug extender and lug shroud is attached.

Referring now to FIG. 11, in some retrofit applications it is necessary to provide a "lug extender" which consists of a copper strap 120 which passes through the passage 104 of the overload relay. The copper strap 120 has a slot 124 in one end for connecting to a contactor and is attached to a lug 128, generally of the compression type, at the other end. An electrically insulating lug shroud 132 covers the lugs 128 thereby providing a barrier to protect against the unintentional contact with live parts. The lug shroud 132, as illustrated in FIG. 12, defines apertures 136 for receiving electrical conductors providing power to the protected device and slots 138 which slidingly receive the lugs 128. The lug shroud 132 is attached to the housing 10 by flanges 140 located at each end of the lug shroud 132 which are received within grooves 144 defined by the upper housing 20 and tabs 148 defined by the lower housing 18 which engage a lower surface of the lug shroud 132. In some applications the overload relay requires lugs 128 on both sides. Therefore the copper strap 120 is generally straight at both ends and lug shrouds 132 are provided on both sides of the enclosure 10.

From the foregoing description, it will be recognized by those skilled in the art that an enclosure for a solid state overload relay mechanism or other device offering advantages over the prior art has been provided. Specifically, the enclosure provides a means for securing a mounting plate to a housing without the use of conventional fastening devices. Further, the enclosure of the present invention provides a method for securing the mounting plate to the housing using a constant positive force in order to maintain the relationship between the two.

While a preferred embodiment has been shown and described, it will be understood that it is not intended to limit

Having thus described the aforementioned invention,
We claim:

1. An enclosure securable to a selected structure comprising:

a mounting plate defining at least one flange, said flange defining at least one flange opening; and a housing defining at least one housing opening dimensioned to receive said at least one flange defined by said mounting plate and having at least one integrally formed tab member proximate each said at least one housing opening, said tab member having a distal end for being selectively received upon manipulation within said at least one flange and thereby engaging an edge of said flange opening to apply a constant positive force between said housing and said mounting plate in order to fix a relative position therebetween.

2. The enclosure of claim 1 wherein said mounting plate defines another flange being oppositely disposed and substantially parallel to said at least one flange, each said flange extending from said mounting plate at a substantially right angle.

3. The enclosure of claim 1 wherein each said at least one tab member defined by said housing further defines a substantially L-shaped configuration wherein a vertical portion extends generally upward terminating at said distal end and a horizontal portion flexibly attaches said tab member to said enclosure, said distal end of said tab member being selectively engaged by said upper edge of said flange opening in response to a downward pressure applied to said horizontal member.

4. The enclosure of claim 1 wherein said housing includes an upper housing and a lower housing each having an integrally formed cooperating means for securing one to another in a conventional snap-fit manner.

5. The enclosure of claim 1 provided for housing a solid state overload relay mechanism.

6. An enclosure securable to a selected structure comprising:

a mounting plate defining two oppositely disposed, substantially parallel flanges, each said flange extending from said mounting plate at a substantial right angle, each said flange defining at least one flange opening; and a housing defining two housing openings each dimensioned to receive one said flanges defined by said mounting plate and having at least one integrally formed tab member proximate each said housing opening to cooperate with each said flange opening, each said tab member defining a substantially L-shaped configuration wherein a vertical portion extends generally upward terminating at a distal end and a horizontal portion flexibly attaches said tab member to said enclosure, said distal end of said tab member being selectively engaged by an edge of said flange opening in response to a downward pressure applied to said horizontal member such that a positive force is maintained therebetween, thus fixing a relative position of said mounting plate and said housing.

7. The enclosure of claim 6 wherein said housing includes an upper housing and a lower housing each having an integrally formed cooperating means for securing one to another in a conventional snap-fit manner.

8. The enclosure of claim 7 provided for housing a solid state overload relay mechanism.

9. An enclosure securable to a selected structure for housing a solid state overload relay mechanism, said enclosure comprising:

a mounting plate defining two oppositely disposed, substantially parallel flanges, each said flange extending from said mounting plate at a substantial right angle, each said flange defining at least one flange opening; and a housing defining two housing openings, each dimensioned to receive one of said flanges defined by said mounting plate and having at least one integrally formed tab member proximate each said housing opening to cooperate with said at least one flange opening, each said tab member defining a substantially L-shaped configuration wherein a vertical portion of said tab member extends generally upward terminating at a distal end and a horizontal portion flexibly attaches said tab member to said enclosure, said distal end of said tab member being selectively engaged by an edge of said flange opening in response to a downward pressure applied to said horizontal member such that a positive force is maintained therebetween, thus fixing a relative position of said mounting plate and said housing, said housing including an upper housing and a lower housing each having an integrally formed cooperating means for securing one to another in a conventional snap-fit manner.

10. An enclosure securable to a selected structure comprising:

a mounting plate defining at least one flange, said flange defining at least one flange opening; and a housing defining at least one housing opening and at least one tab member integrally formed from said housing and extending into said at least one housing opening, said housing opening dimensioned to receive said at least one flange defined by said mounting plate and said tab member having a distal end for selectively engaging an edge of said flange opening thereby applying a constant positive force between said housing and said mounting plate in order to fix a relative position therebetween.

11. The enclosure of claim 10 wherein each said at least one tab member further defines a substantially L-shaped configuration wherein a vertical portion extends generally upward terminating at said distal end and a horizontal portion flexibly attaches said tab member to said enclosure, said distal end of said tab member being selectively engaged by said edge of said flange opening in response to a downward pressure applied to said horizontal member.

12. The enclosure of claim 10 wherein said mounting plate defines a second flange being oppositely disposed and substantially parallel to said at least one flange, said second flange also defining a second flange opening, each said flange extending from said mounting plate at a substantially right angle.

13. The enclosure of claim 12 wherein said housing further defines a second housing opening and a second tab member integrally formed from said housing and extending into said second housing opening, said second housing opening dimensioned to receive said second flange defined by said mounting plate and said second tab member having a distal end for selectively engaging upon manipulation an edge of said second flange opening.

14. The enclosure of claim 10 wherein said housing includes an upper housing and a lower housing each having an integrally formed cooperating means for securing one to another in a conventional snap-fit manner.

15. The enclosure of claim 10 provided for housing a solid state overload relay mechanism.

* * * * *